United States Patent
Salsi et al.

(10) Patent No.: US 9,973,836 B1
(45) Date of Patent: May 15, 2018

(54) DETECTING A TRANSCEIVER USING A NOISE OPTICAL SIGNAL

(71) Applicant: Juniper Networks, Inc., Sunnyvale, CA (US)

(72) Inventors: Massimiliano Salsi, San Jose, CA (US); Domenico Di Mola, Fremont, CA (US); Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

(21) Appl. No.: 15/067,806

(22) Filed: Mar. 11, 2016

(51) Int. Cl.
*H04J 14/00* (2006.01)
*H04Q 11/00* (2006.01)

(52) U.S. Cl.
CPC . *H04Q 11/0071* (2013.01); *H04Q 2011/0009* (2013.01); *H04Q 2011/0032* (2013.01)

(58) Field of Classification Search
CPC ....... H04Q 11/0071; H04Q 2011/0009; H04Q 2011/0032; H04B 10/291; H04B 10/2914; H04B 10/2916; H04B 10/2918; H04B 10/077; H04B 10/0777; H04B 10/0795; H04B 10/07953; H04B 10/0731; H04B 10/0797; H04B 10/07955; H01S 3/067; H01S 5/50
USPC .......................................................... 398/48
See application file for complete search history.

(56) References Cited

U.S. PATENT DOCUMENTS

| | | | |
|---|---|---|---|
| 6,185,022 B1 * | 2/2001 | Harasawa | H04B 10/077 398/9 |
| 6,810,177 B2 | 10/2004 | Kaneko | |
| 7,298,974 B2 | 11/2007 | Tanobe et al. | |
| 8,787,753 B2 * | 7/2014 | Gariepy | H04B 10/0795 398/25 |
| 8,792,787 B1 | 7/2014 | Zhao et al. | |
| 2002/0057875 A1 | 5/2002 | Kaneko | |
| 2002/0131102 A1 * | 9/2002 | Taneda | H04B 10/077 398/26 |
| 2009/0162051 A1 * | 6/2009 | Hudgins | H04B 10/40 398/9 |
| 2013/0016971 A1 | 1/2013 | Zheng et al. | |
| 2016/0142135 A1 * | 5/2016 | He | H04B 10/07953 398/26 |

\* cited by examiner

*Primary Examiner* — M R. Sedighian
(74) *Attorney, Agent, or Firm* — Harrity & Harrity, LLP

(57) ABSTRACT

A method may include causing a signal to be transmitted that includes a plurality of wavelengths. The signal may be transmitted via an optical fiber that is associated with a particular wavelength. The particular wavelength may be included in the plurality of wavelengths. The method may include filtering the signal, based on the particular wavelength, to generate a filtered signal. The filtered signal may include the particular wavelength. The method may include detecting the filtered signal in association with the optical fiber. The method may include determining the particular wavelength based on the filtered signal. The method may include storing or providing information identifying at least one of the particular wavelength, the optical fiber, or a transmitter that transmitted the signal.

20 Claims, 17 Drawing Sheets

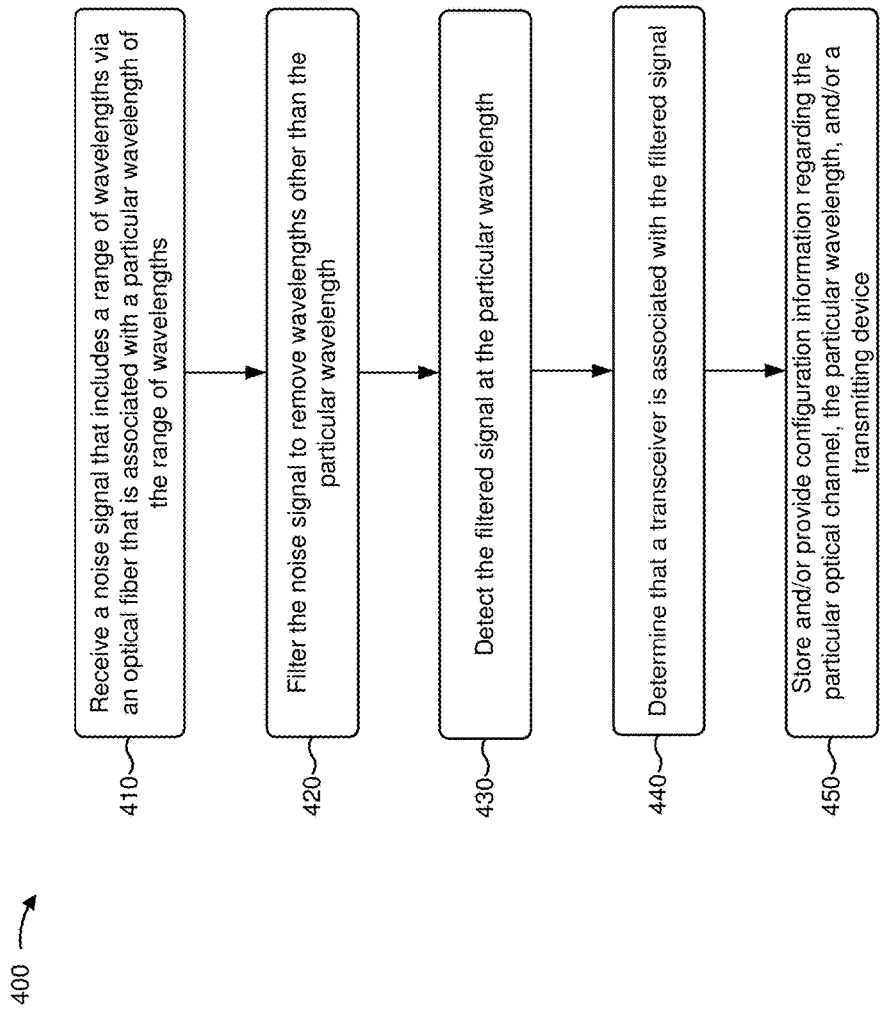

US 9,973,836 B1

DETECTING A TRANSCEIVER USING A NOISE OPTICAL SIGNAL

BACKGROUND

Fiber-optic communication is a mechanism for transmitting information from one place to another by sending pulses of light through an optical fiber. The light forms an electromagnetic carrier wave that may be modulated to carry information. Because of advantages over electrical transmission, optical fibers have largely replaced copper wire communications in core networks. Optical fiber is used by many telecommunications companies to transmit telephone signals, Internet communication, and cable television signals. The process of communicating using fiber-optics involves the following basic steps: creating the optical signal using a transmitter, relaying the signal along a fiber, ensuring that the signal does not become too distorted or weak, receiving the optical signal using a receiver, and converting the optical signal into an electrical signal to determine information carried via the optical signal.

SUMMARY

According to some possible implementations, a method may include causing a signal to be transmitted that includes a plurality of wavelengths. The signal may be transmitted via an optical fiber that is associated with a particular wavelength. The particular wavelength may be included in the plurality of wavelengths. The method may include filtering the signal, based on the particular wavelength, to generate a filtered signal. The filtered signal may include the particular wavelength. The method may include detecting the filtered signal in association with the optical fiber. The method may include determining the particular wavelength based on the filtered signal. The method may include storing or providing information identifying at least one of the particular wavelength, the optical fiber, or a transmitter that transmitted the signal.

According to some possible implementations, a system may include a transceiver comprising a transmitter and an amplifier to transmit a noise signal of a plurality of wavelengths when the transmitter does not specify a wavelength. The system may include an optical fiber connected with the transceiver and transporting the noise signal. The optical fiber may be associated with a particular wavelength. The system may include a multiplexer to receive the noise signal via the optical fiber. The multiplexer may be connected to a plurality of optical fibers, including the optical fiber. The multiplexer may filter the plurality of wavelengths based on the particular wavelength, and may pass a filtered signal, of the particular wavelength, to an optical channel monitor. The optical channel monitor may detect the filtered signal and determine the particular wavelength. A controller device may cause the amplifier to transmit the noise signal, and may determine that the filtered signal is associated with the transceiver.

According to some possible implementations, a device may include one or more processors. The one or more processors may cause an amplifier to transmit a noise signal via an optical fiber, of a plurality of optical fibers. The one or more processors may detect the noise signal. The one or more processors may determine that the noise signal is associated with the optical fiber and that the noise signal originates from the amplifier. The one or more processors may obtain information identifying another device, a particular wavelength, and another optical fiber, of a plurality of other optical fibers. The one or more processors may configure the amplifier to transmit a signal of the particular wavelength. The one or more processors may configure the device to transmit the signal of the particular wavelength toward the other device and the other optical fiber.

BRIEF DESCRIPTION OF THE DRAWINGS

FIG. 4 is a flow chart of an example process for identifying a transceiver based on a noise signal;

FIGS. 5A-5C are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A network device may include a variety of optical fibers connected to a multiplexer. Signals, received via the variety of optical fibers, may be filtered to particular wavelengths corresponding to each of the variety of optical fibers. When connecting a transceiver to a particular optical fiber, the network device may need to determine a particular wavelength corresponding to the particular optical fiber. However, based on the multiplexer filtering wavelengths other than the particular wavelength, determining the particular wavelength may be time consuming. Implementations described herein enable the network device to more efficiently determine the particular wavelength by transmitting a noise signal including a variety of wavelengths, and improve efficiency of implementing multiple network devices (e.g., by performing a "plug and play" configuration of the multiple network devices).

Figure 1A:
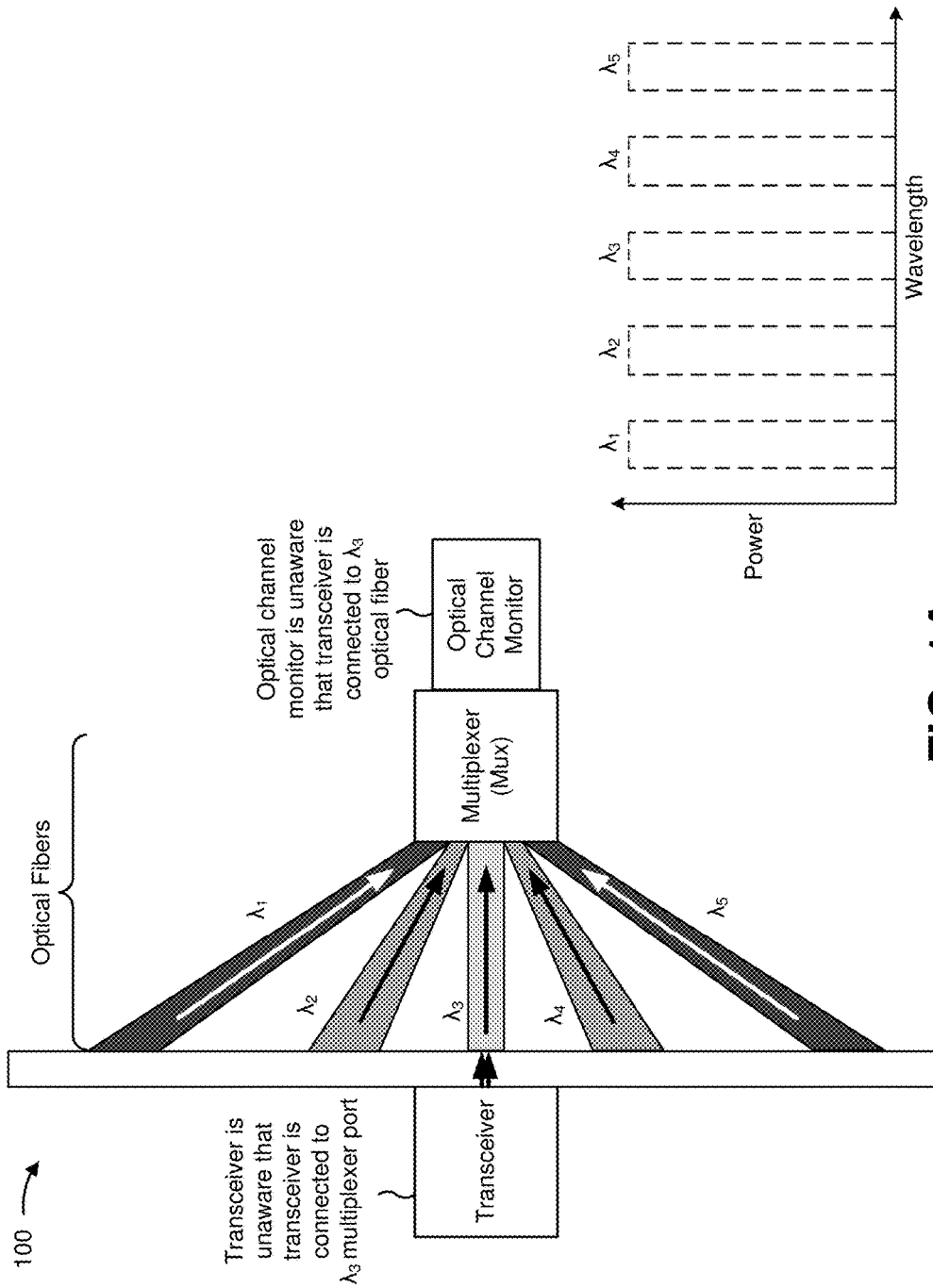
FIGS. 1A-1C are diagrams of an overview of an example implementation described herein.
Figure 1B:
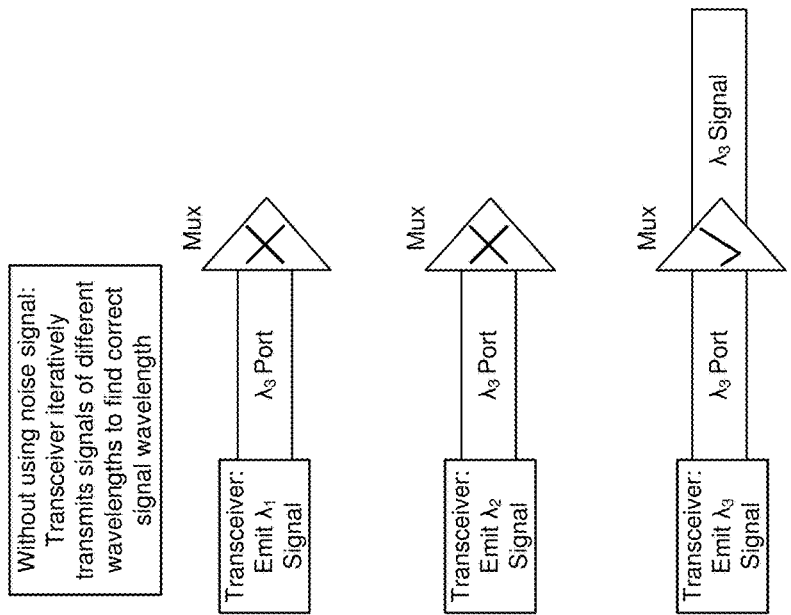
Figure 1C:
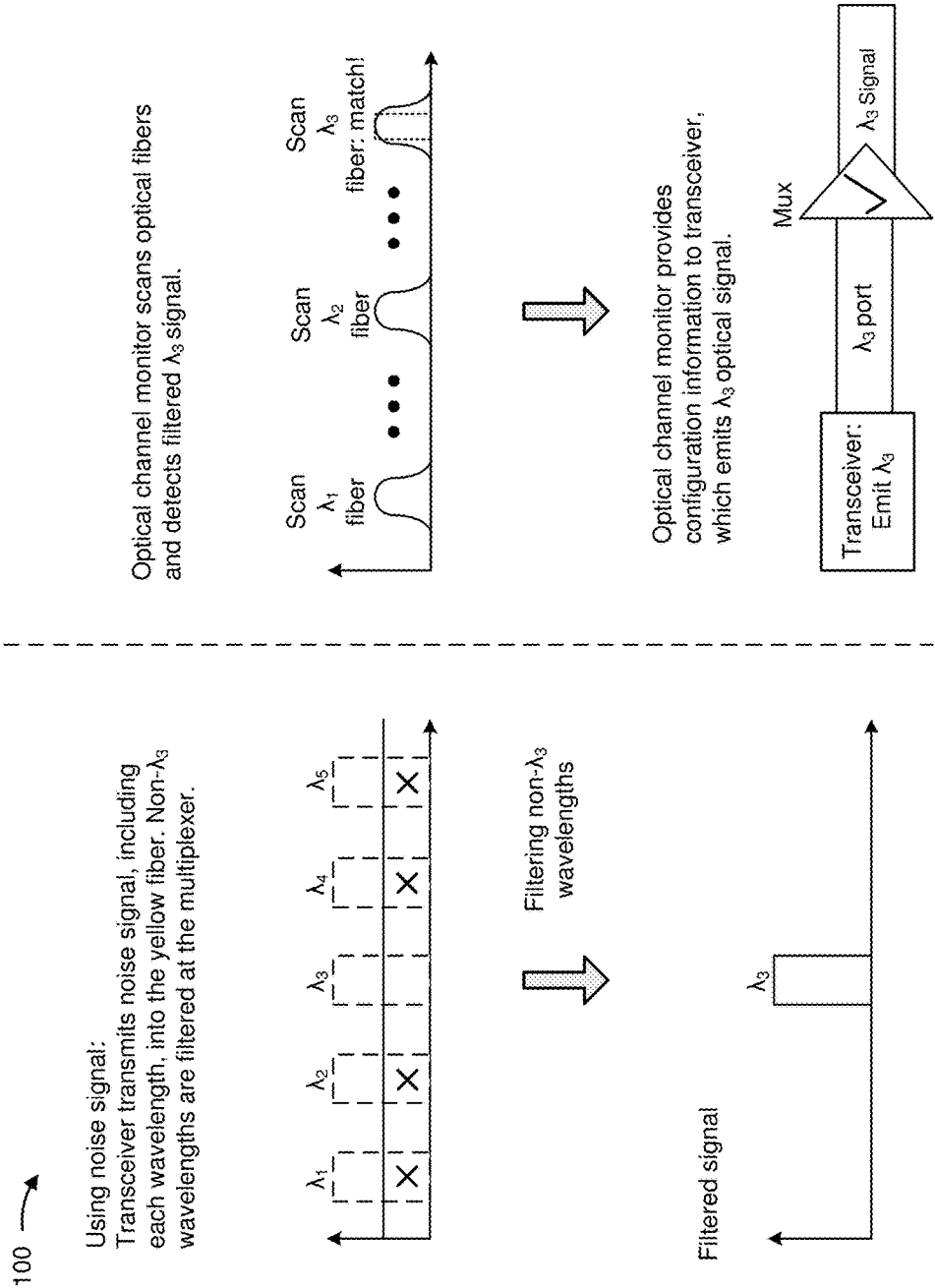

FIGS. 1A-1C are diagrams of an overview of an example implementation 100 described herein. Assume that FIGS. 1A-1C show a network device that includes a transceiver, a multiplexer (e.g., a "Mux") with five connected optical fibers, and an optical channel monitor.

As shown in FIG. 1A, each of the five optical fibers may be associated with a particular wavelength based on corresponding multiplexer ports. Here, a first optical fiber is associated with a wavelength of $\lambda_1$, a second optical fiber is associated with a wavelength of $\lambda_2$, a third optical fiber is associated with a wavelength of $\lambda_3$, a fourth optical fiber is associated with a wavelength of $\lambda_4$, and a fifth optical fiber is associated with a wavelength of $\lambda_5$. Assume that the multiplexer ports will filter, from each optical signal, wavelengths other than the associated wavelength. For example, the multiplexer will only pass optical signals with a wavelength of $\lambda_1$ via the multiplexer port associated with the wavelength of $\lambda_1$, and so on. As shown, the transceiver is connected to the optical fiber that is associated with the wavelength of $\lambda_3$. As further shown, neither the transceiver nor the optical channel monitor are aware that the transceiver is connected to the optical fiber associated with the wavelength of $\lambda_3$.

As shown in FIG. 1B, if the transceiver does not transmit a noise signal including a variety of wavelengths, the transceiver may iteratively transmit signals of different wavelengths to determine a correct optical signal wavelength. As shown, the transceiver may first transmit a signal with a wavelength of $\lambda_1$, and may determine that the signal is filtered by the multiplexer. As further shown, the transceiver may second transmit a signal with a wavelength of $\lambda_2$, and may determine that the signal is filtered by the multiplexer. As shown, the transceiver may third transmit a signal with a wavelength of $\lambda_3$, and may determine that the signal is passed by the multiplexer. Assume that the optical channel monitor detects the signal and transmits information identifying the wavelength of $\lambda_3$ to the transceiver. As described in FIG. 1B, the process of determining the correct optical signal wavelength may be time consuming and inefficient.

As shown in FIG. 1C, rather than iteratively transmitting signals of different wavelengths, the transceiver may transmit a noise signal into the fiber that is associated with the wavelength of $\lambda_3$ that includes each of the wavelengths (e.g., $\lambda_1$, $\lambda_2$, $\lambda_3$, $\lambda_4$, and $\lambda_5$). As further shown, the multiplexer may filter the signal based on the wavelength of $\lambda_3$, and may pass an optical signal including only the wavelength of $\lambda_3$.

As shown, the optical channel monitor may scan the optical fibers, and may detect the filtered optical signal with the wavelength of $\lambda_3$. Assume that the optical channel monitor provides configuration information, identifying the wavelength of $\lambda_3$, to the transceiver. As shown, based on the configuration information, the transceiver may transmit optical signals with a wavelength of $\lambda_3$, which may pass the multiplexer and be routed, by the network device, to a destination (e.g., a remote network device).

Implementations described herein may enable the network device to determine a particular wavelength at which to transmit an optical signal via an optical fiber of a multiplexer. By transmitting a noise signal that includes multiple different wavelengths via the optical fiber, the network device may reduce an amount of time and/or effort required to determine the particular wavelength (e.g., based on the multiplexer filtering wavelengths other than the particular wavelength). Implementations described herein may provide configuration information, to the transceiver or another device, based on determining the particular wavelength, which improves efficiency and reduces time consumption when implementing the network device, or other network devices, in an optical network.

Figure 2A:
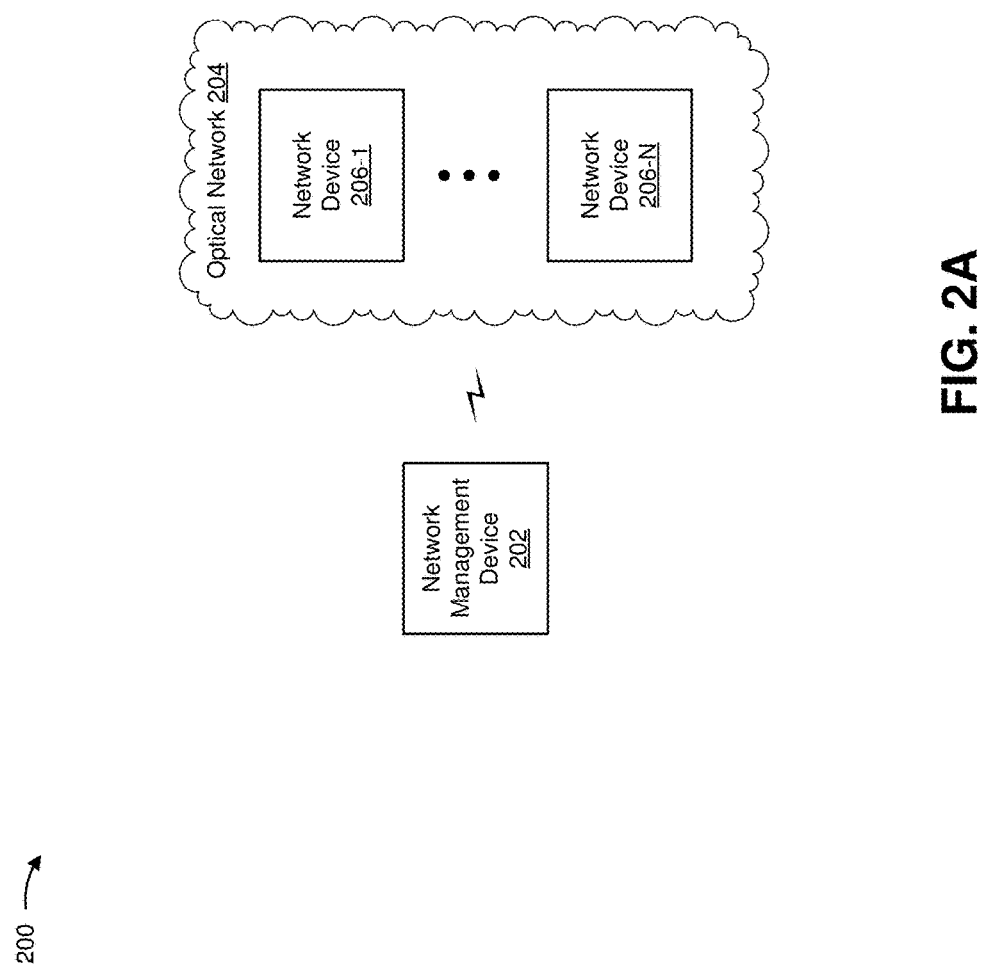
FIGS. 2A-2C are diagrams of an example environment in which systems and/or methods, described herein, may be implemented.
Figure 2B:
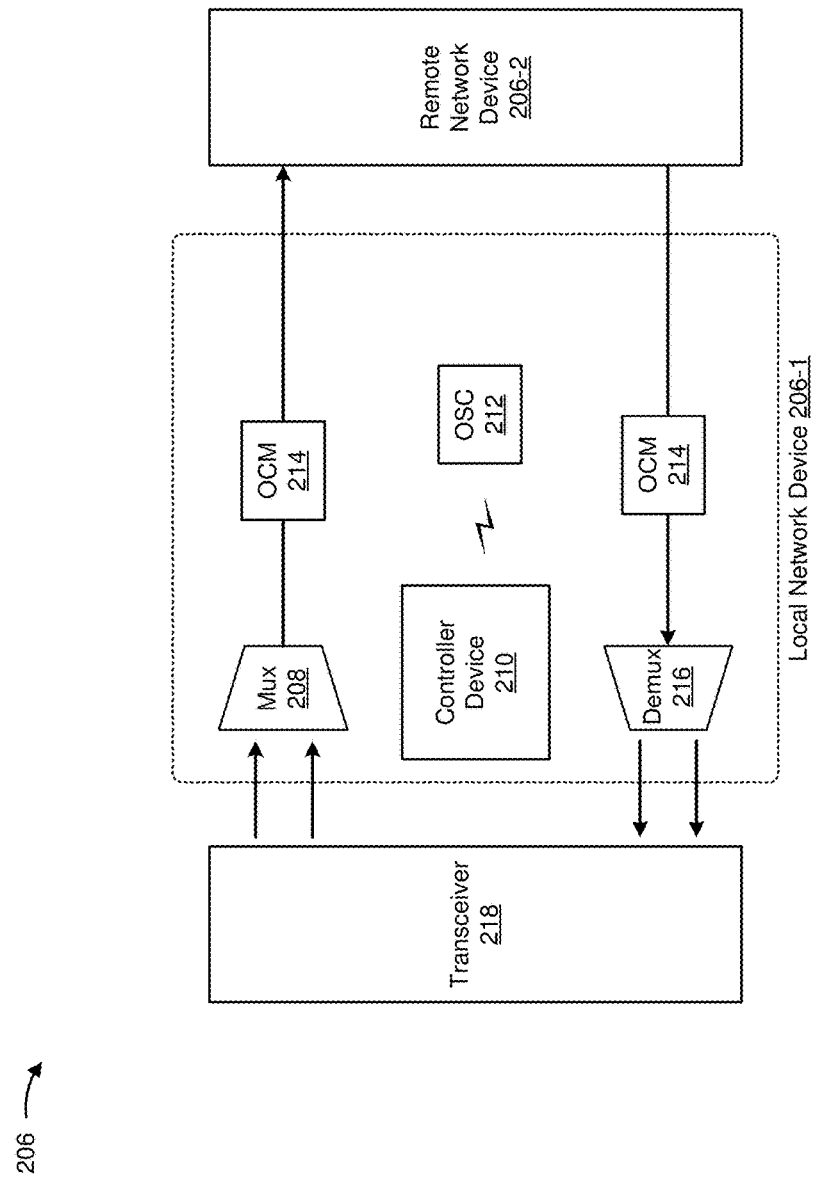
Figure 2C:
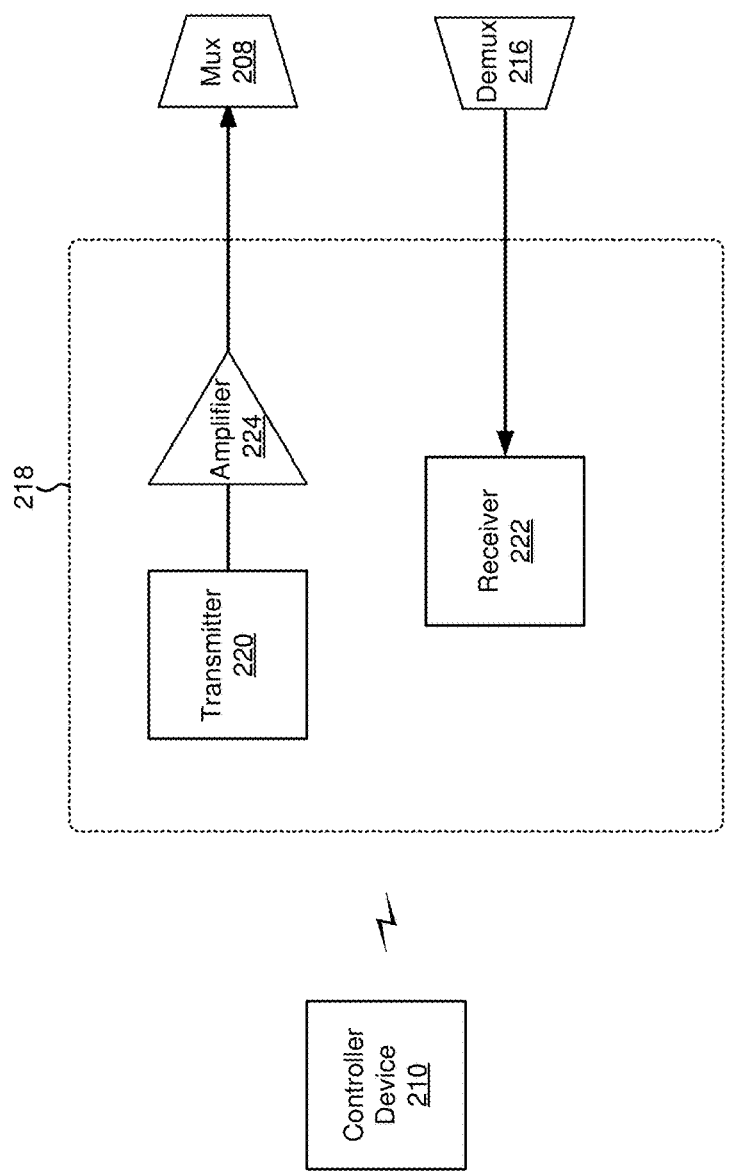

FIGS. 2A-2C are diagrams of an example environment 200 in which systems and/or methods, described herein, may be implemented. As shown in FIG. 2A, environment 200 may include a network management device 202, an optical network 204, and one or more network devices 206-1 through 206-N (N≥1) (hereinafter referred to collectively as "network devices 206," and individually as "network device 206"). Devices of environment 200 may interconnect via wired connections, wireless connections, or a combination of wired and wireless connections.

Network management device 202 may include one or more devices capable of receiving, generating, storing, processing, and/or providing information associated with a network (e.g., optical network 204). For example, network management device 202 may include a computing device, such as a server or a similar type of device. Network management device 202 may assist a user in modeling and/or planning a network, such as optical network 204. For example, network management device 202 may assist in modeling and/or planning an optical network configuration, which may include quantities, locations, capacities, parameters, and/or configurations of network devices 206. In some implementations, network management device 202 may be associated with a user interface. In some implementations, network management device 202 may be a distributed device associated with one or more network devices 206. For example, network management device 202 may be included in a controller device 210 of one or more network devices 206. In some implementations, network management device 202 may be separate from network device 206, but may be linked to network device 206 via a protocol interface, such as an application programming interface, or the like.

Optical network 204 may include any type of network that uses light as a transmission medium. For example, optical network 204 may include a fiber-optic based network, an optical transport network, a light-emitting diode network, a laser diode network, an infrared network, an optical amplifier and/or a combination of these or other types of optical networks. Optical network 204 may include one or more optical routes (e.g., optical lightpaths) that may specify a route along which light is carried (e.g., using one or more optical links) between two or more network devices 206 (e.g., via an optical link) and may also include one or more monitoring devices, such as an optical channel monitor (OCM). An optical link may include an optical fiber, an optical control channel, an optical data channel, or the like, and may carry an optical signal (e.g., a signal associated with a particular wavelength of light), an optical super-channel (e.g., a set of optical signals), a super-channel set, an optical carrier set, a set of spectral slices, or the like.

Network device 206 may include one or more devices capable of receiving, generating, storing, processing, and/or providing data carried by an optical signal via an optical link. For example, network device 206 may include one or more optical data processing and/or optical traffic transfer devices, such as an optical amplifier (e.g., a doped fiber amplifier, an erbium doped fiber amplifier, a Raman amplifier, etc.), an optical add-drop multiplexer (OADM) (e.g., a reconfigurable optical add-drop multiplexer (ROADM), a flexibly reconfigurable optical add-drop multiplexer ("FROADM") that may utilize a flexible wavelength grid, etc.), an optical source device (e.g., a laser source), an optical destination device (e.g., a laser sink), an optical multiplexer, an optical demultiplexer, an optical transmitter, an optical receiver, an optical transceiver, a photonic integrated circuit (PIC), an integrated optical circuit, or the like. In some implementations, network device 206 may include one or more optical components. Network device 206 may process and/or transmit an optical signal (e.g., to another network device 206 via an optical link) to deliver the optical signal through optical network 204.

As shown in FIG. 2B, network device 206 may include a multiplexer 208, a controller device 210, an optical supervisory channel (OSC) 212, an optical channel monitor (OCM) 214, a demultiplexer 216, and a transceiver 218.

Multiplexer 208 may include, for example, an optical multiplexer (e.g., a power multiplexer, a WSS-based multiplexer, a multi-cast multiplexer, or the like) that combines multiple input channels for transmission via an output fiber. For example, multiplexer 208 may combine multiple optical signals received via multiple optical fibers, and may provide the combined signals to another device via an optical link (e.g., a fiber). In some implementations, multiplexer 208 may filter optical signals. For example, multiplexer 208 may include an array waveguide grating (AWG) that filters optical signals based on particular wavelengths.

Controller device 210 may include, for example, one or more devices capable of receiving, generating, storing, processing, and/or providing information associated with network device 206. For example, controller device 210 may include a server, an application-specific integrated circuit, or the like. Controller device 210 may cause components of network device 206 to perform operations. For example, controller device 210 may cause transmitter 220 to generate an optical signal of a particular wavelength, may cause amplifier 224 to amplify an optical signal (e.g., an optical signal of the particular wavelength, a noise signal, etc.), or the like. In some implementations, controller device 210 may receive configuration information from another device (e.g., OCM 214, remote network device 206-2, etc.) and may cause the components of network device 206 to perform the operations based on the configuration information. In some implementations, controller device 210 may perform operations related to configuring optical network 204 and/or network device 206 (e.g., routing network traffic based on configuration information, determining whether an optical signal, detected by OCM 214, is associated with transceiver 218, etc.).

OSC 212 may include, for example, an amplifier, an emitter, or the like, that emits and/or receives a signal (e.g., an optical signal) on a particular channel (e.g., a particular wavelength) via which network devices 206 may communicate. OSC 212 may be associated with a particular wavelength, in some implementations. Network management device 202 and/or controller device 210 may provide information to, receive information from, and/or cause information to be provided between network devices 206 via OSC 212. In some implementations, network device 206-1 may provide information (e.g., a network address associated with network device 206-1, a network address associated with transceiver 218, an optical wavelength of a signal, a multiplexer port number, etc.) to network device 206-2 via OSC 212, or may receive information from network device 206-2 via OSC 212.

OCM 214 may include, for example, a device that detects an optical signal and determines a wavelength associated with the optical signal. For example, OCM 214 may include a photodetector, or a group of photodetectors. OCM 214 may monitor (e.g., scan, sweep, etc.) ports of multiplexer 208, and may detect an optical signal, transmitted by transceiver 218 and/or filtered by multiplexer 208. OCM 214 may determine a wavelength associated with the detected optical signal.

Demultiplexer 216 may include, for example, an optical de-multiplexer (e.g., a power demultiplexer, a WSS-based demultiplexer, an AWG, or the like) that separates optical signals 226 carried over an input fiber. For example, demultiplexer 216 may separate a multiplexed optical signal into constituent optical signals, and may provide each of the constituent optical signals 226 to a corresponding transceiver 218.

As shown in FIG. 2C, transceiver 218 may include, for example, a transmitter 220, a receiver 222, and an amplifier 224. Transceiver 218 may transmit an optical signal to multiplexer 208, and may receive an optical signal from demultiplexer 216.

Transmitter 220 may include, for example, an optical transmitter and/or an optical transceiver that generates an optical signal when a voltage or current is applied. For example, transmitter 220 may include one or more integrated circuits, such as a transmitter photonic integrated circuit (PIC), an application specific integrated circuit (ASIC), or the like. In some implementations, transmitter 220 may include a laser associated with each wavelength associated with transmitter 220, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). In some implementations, transmitter 220 may be tuned to transmit an optical signal of a particular wavelength based on configuration information that identifies the particular wavelength.

Receiver 222 may include, for example, an optical receiver and/or an optical transceiver that generates an electrical signal based on a received optical signal. For example, receiver 222 may include one or more integrated circuits, such as a receiver PIC, an ASIC, or the like. In some implementations, receiver 222 may include a photodetector to convert an optical signal to a voltage signal, an analog-to-digital converter to convert voltage signals to digital signals, and/or a digital signal processor to process the digital signals. In some implementations, a single receiver 222 may be associated with a single optical signal. In some implementations, a single receiver 222 may be associated with multiple optical signals, or multiple receivers 222 may be associated with a single optical signal. In some implementations, receiver 222 may be tuned to receive an optical signal of a particular wavelength based on configuration information that identifies the particular wavelength.

Amplifier 224 may include an amplifying device, or a collection of amplifying devices. In some implementations, amplifier 224 may include an amplifier that may directly amplify an input optical signal (e.g., a signal supplied by transmitter 220). In some implementations, amplifier 224 may include a variable optical amplifier (VOA), a semiconductor optical amplifier (SOA), a doped fiber amplifier (e.g., an erbium-doped fiber amplifier, an erbium-doped waveguide amplifier, etc.). In some implementations, amplifier 224 may include another type of light source that is capable of providing a noise signal (e.g., a light-emitting diode, etc.). When a voltage or current is applied to amplifier 224, amplifier 224 may amplify an optical signal received from transmitter 220. When a voltage or current is applied to amplifier 224 without amplifier 224 receiving an optical signal from transmitter 220, amplifier 224 may generate a noise signal (e.g., a white noise signal, etc.) that includes a set of wavelengths.

The number and arrangement of devices and networks shown in FIGS. 2A-2C are provided as an example. In practice, there may be additional devices and/or networks, fewer devices and/or networks, different devices and/or networks, or differently arranged devices and/or networks than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) of network 200 may perform one or more functions described as being performed by another set of devices of network 200.

Figure 3:
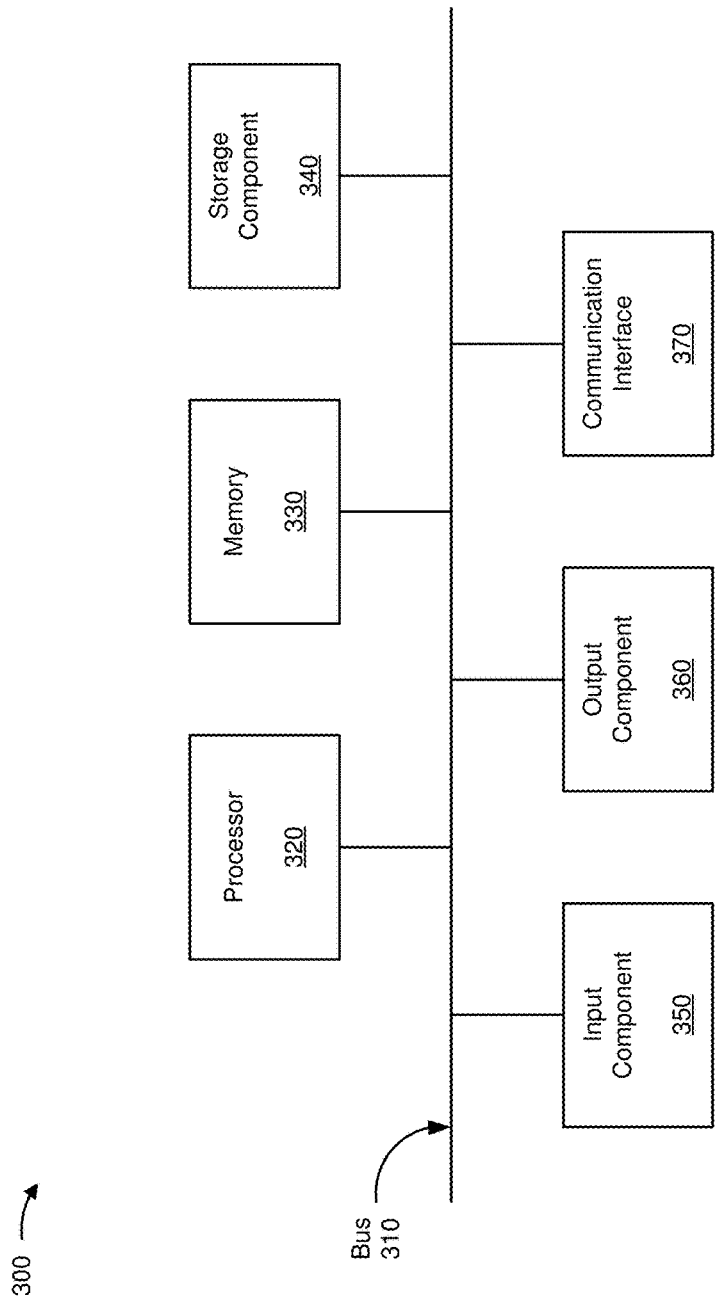
FIG. 3 is a diagram of example components of one or more devices of FIG. 2.

FIG. 3 is a diagram of example components of a device 300. Device 300 may correspond to network management device 202 and/or controller device 210. In some implementations, network management device 202 and/or controller device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of receiving and/or executing instructions. In some implementations, processor 320 can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying a transceiver based on a noise signal. In some implementations, one or more process blocks of FIG. 4 may be performed by network device 206 and/or components of network device 206. In some implementations, one or more process blocks of FIG. 4 may be performed by another device or a group of devices separate from or including network device 206, such as network management device 202.

As shown in FIG. 4, process 400 may include receiving a noise signal that includes a range of wavelengths via an optical fiber that is associated with a particular wavelength of the range of wavelengths (block 410). For example, multiplexer 208 of network device 206 may receive a noise signal. Multiplexer 208 may receive the noise signal from transceiver 218, or from a component of transceiver 218 (e.g., amplifier 224 of transceiver 218). Multiplexer 208 may receive the noise signal via an optical fiber that is associated with a particular wavelength. For example, multiplexer 208 may filter optical signals received via the optical fiber based on the particular wavelength, as described in more detail below.

In some implementations, amplifier 224 may generate the noise signal. For example, when amplifier 224 receives an optical signal from transmitter 220, amplifier 224 may receive voltage or current, and may amplify the received optical signal. In a situation where amplifier 224 receives voltage or current and does not receive an optical signal from transmitter 220, amplifier 224 may generate and/or transmit the noise signal. In some implementations, controller device 210 may cause amplifier 224 to generate the noise signal. For example, controller device 210 may cause the voltage or current to be provided to amplifier 224 (e.g., by transmitter 220, by network device 206, etc.) to facilitate determination of the particular wavelength.

In some implementations, controller device 210 may record a time value of a transmission time associated with the noise signal. For example, based on causing amplifier 224 to generate and transmit the noise signal, controller device 210 may store information associating the noise signal with a transmission time. Controller device 210 may compare the transmission time to a time value of a receipt time determined based on OCM 214 receiving a filtered signal, to determine whether the filtered signal is related to the noise signal, as described in more detail elsewhere herein.

Network device 206 and/or transceiver 218 may be associated with a network address, such as an Internet Protocol (IP) address or the like. When configuring transceiver 218, network device 206 may provide the network address to another device. For example, local network device 206-1 may provide a first network address to remote network device 206-2, which may perform configuration operations as described herein, and remote network device 206-2 may provide a second network address to local network device 206-1. Based on the first network address and the second network address, local network device 206-1 and remote network device 206-2 may communicate.

The noise signal may include light, of a range of wavelengths, a set of wavelengths, or the like. In some implementations, the noise signal may include a white noise signal (e.g., an optical signal including a constant power spectral density). For example, amplifier 224 may generate a noise signal when receiving voltage or current without receiving an optical signal from transmitter 220, and the noise signal may include a range of wavelengths. The particular wavelength, associated with the optical fiber of multiplexer 208, may be included in the range of wavelengths. In this way, multiplexer 208 may pass the particular wavelength, which permits OCM 214 to detect the particular wavelength, and, thus, associate transceiver 218 with the particular wavelength and/or the optical fiber.

In some implementations, amplifier 224 may generate the noise signal to enable network device 206 to determine the particular wavelength of the optical fiber to which transceiver 218 is connected. For example, when installing network device 206, a technician may connect transceiver 218 to a particular optical fiber, of a set of optical fibers of multiplexer 208. The particular optical fiber may be associated with a particular wavelength. When multiplexer 208 receives an optical signal via the particular optical fiber, multiplexer 208 may filter wavelengths of light other than the particular wavelength (e.g., may pass the particular wavelength), as described in more detail below.

The technician and/or transceiver 218 may not know the particular wavelength, which may hinder implementation of network device 206. For example, the technician may select an available optical fiber to connect with network device 206, without knowing the particular wavelength associated with the available optical fiber. To determine the particular wavelength, network device 206 may iteratively check wavelengths until determining the particular wavelength that passes multiplexer 208, which may be time consuming. By generating the noise signal, which may include the particular wavelength, amplifier 224 may permit OCM 214 to detect a filtered signal of the particular wavelength after multiplexer 208 passes the filtered signal of the particular wavelength. This reduces effort and/or planning required to determine the particular wavelength and, thus, conserves resources.

In some implementations, controller device 210 may refer to configuration information, related to network device 206 and/or transceiver 218, to determine a configuration of transceiver 218. For example, if a transceiver 218 of remote network device 206-2 is associated with a particular optical fiber, a particular wavelength, a particular multiplexer port, a or the like, local network device 206-1 may refer to configuration information associated with remote network device 206-2 to determine the particular optical fiber and/or the particular wavelength. In some implementations, local network device 206-1 may obtain the configuration information (e.g., from controller device 210, from network management device 202, etc.).

In some implementations, controller device 210, of local network device 206-1 may obtain configuration information from remote network device 206-2, as described in more detail in connection with FIG. 6, below. For example, controller device 210 may obtain the configuration information to determine a particular optical fiber, of local network device 206-1, to connect with transceiver 218. As another example, controller device 210 may obtain the configuration information to determine a network address, associated with remote network device 206-2, based on which to route fiber optic network traffic to and/or from remote network device 206-2. In some implementations, controller device 210 may obtain the configuration information via OSC 212.

As further shown in FIG. 4, process 400 may include filtering the noise signal to remove wavelengths other than the particular wavelength (block 420). For example, multiplexer 208 (e.g., an array waveguide grating of multiplexer 208) may filter optical signals received via each optical fiber according to the corresponding particular wavelength of the optical fiber. For example, if an optical fiber is associated with a particular wavelength of 1551.32 nanometers (nm), multiplexer 208 may filter signals, received via the optical fiber, of wavelengths other than 1551.32 nm. As another example, if the optical fiber receives a noise signal of 600 nm-1500 nm, multiplexer 208 may filter the noise signal, and may pass an optical signal of 1551.32 nm to OCM 214 or another device.

In some implementations, multiplexer 208 may be programmed to pass a particular wavelength of the noise signal. For example, multiplexer 208 may include a reconfigurable optical add-drop multiplexer (ROADM), or the like. Unused ports, of multiplexer 208, may be programmed to pass light at different wavelengths. In such cases, when a noise signal is transmitted via a particular port that is associated with a particular wavelength, multiplexer 208 may filter the noise signal to the particular wavelength. OCM 214 may detect the filtered noise signal at the particular wavelength, and controller device 210 may associate the detected noise signal with the particular port based on information associating the particular port with the particular wavelength. For example, controller device 210 may associate the filtered noise signal with a network address of the particular port, such as a multiplexer port identifier, or the like.

In some implementations, controller device 210 may provide the multiplexer port identifier and/or a network address of local network device 206-1 and/or transceiver 218 to remote network device 206-2. For example, remote network device 206-2 may include a ROADM, and remote network device 206-2 may configure the ROADM based on the multiplexer port identifier and/or the network address of local network device 206-1/transceiver 218. In such cases, local network device 206-1 and remote network device 206-2 may communicate to assign a particular wavelength and/or time slot to communications between local network device 206-1 and remote network device 206-2.

As further shown in FIG. 4, process 400 may include detecting the filtered signal at the particular wavelength (block 430). For example, multiplexer 208 may filter the noise signal according to a particular wavelength, and may pass a filtered signal of the particular wavelength to OCM 214. OCM 214 may detect the filtered signal, and may determine the particular wavelength of the filtered signal. In some implementations, OCM 214 may determine a receipt time of receiving the filtered signal, which may aid controller device 210 to identify a particular transceiver 218 that transmits the unfiltered noise signal. In some implementations, OCM 214 may determine connection information based on detecting the filtered signal, such as a multiplexer port, a particular optical fiber, a time slot for transceiver 218, or the like.

As further shown in FIG. 4, process 400 may include determining that a transceiver is associated with the filtered signal (block 440). For example, OCM 214 may determine a receipt time of receiving the filtered signal. OCM 214 may provide information identifying the receipt time to another device (e.g., network management device 202, controller device 210, etc.). Transceiver 218 may transmit the noise signal at a particular transmission time, and another device (e.g., network management device 202, controller device 210, etc.) may store information identifying the transmission time. Network management device 202 and/or controller device 210 may compare the transmission time and the receipt time to determine whether transceiver 218 transmitted the noise signal. In some implementations, OCM 214 may determine a direction to associate with the filtered signal (e.g., east, west, etc.), such as when network device 206 is included in an optical network 204 of a ring-based configuration.

In some implementations, OCM 214 may receive multiple filtered signals. For example, a technician may connect multiple transceivers 218 to multiple optical fibers. Each transceiver 218 may transmit a noise signal into the corresponding optical fiber. In some implementations, the transceivers 218 may transmit the noise signals at different transmission times, and OCM 214 may receive the corresponding filtered signals at different receipt times. In such implementations, controller device 210 may identify which transceiver 218 is associated with each of the optical fibers by comparing the different transmission times to the different receipt times.

Additionally, or alternatively, controller device 210 may selectively activate and/or deactivate transceivers 218 to associate the transceivers 218 with optical fibers. For example, controller device 210 may cause a first transceiver 218 to emit a noise signal, and may match the first transceiver 218 to a first optical fiber based on OCM 214 receiving a first filtered signal (e.g., of a first wavelength). Controller device 210 may deactivate the first transceiver 218, and may cause a second transceiver 218 to emit a noise signal. Controller device 210 may match the second transceiver 218 to a second optical fiber based on OCM 214 receiving a second filtered signal (e.g., of a second wavelength that is different than the first wavelength, of the first wavelength, etc.).

As further shown in FIG. 4, process 400 may include storing and/or providing configuration information regarding the particular optical fiber, the particular wavelength, and/or the transceiver (block 450). For example, controller device 210 may store and/or provide configuration information regarding the particular optical fiber, the particular wavelength, and/or the transceiver. In some implementations, network management device 202 may provide and/or store the configuration information. In some implementations, controller device 210 may receive, store and/or provide configuration information to perform "plug and play" configuration operations without preemptively planning particular multiplexer ports to which to connect the set of network devices 206, which reduces expense and improves reliability of configuration of the set of network devices 206.

In some implementations, controller device 210 may provide configuration information to transceiver 218. For example, controller device 210 may provide information identifying the particular wavelength of the optical fiber to which transmitter 220 is connected, which may cause transmitter 220 to transmit an optical signal of the particular wavelength to amplifier 224. Amplifier 224 may amplify the optical signal of the particular wavelength, and may provide the amplified optical signal to network device 206 for transmission. In this way, network device 206 may use a noise signal to determine a particular wavelength of an optical fiber to which transceiver 218 is connected, which conserves time and/or processing resources of components of network device 206. In some implementations, controller device 210 may determine a particular direction to associate with the noise signal. For example, in some implementations, local network device 206-1 and remote network device 206-2 may be included in an optical network 204 of a ring-based configuration. In such an optical network 204, network devices 206 may route traffic in a first direction around the ring-based optical network (e.g., clockwise, west, etc.), or in a second direction around the ring-based optical network (e.g., counterclockwise, east, etc.). Controller device 210 of local network device 206-1 may determine a particular direction, which may be associated with an optical fiber and/or a particular wavelength of the optical fiber, a noise signal, or the like. Local network device 206-1 may communicate the particular direction to remote network device 206-2 (e.g., in association with the configuration information), and network device 206-2 (e.g., controller device 210, etc.) may configure remote network device 206-2 and/or transceiver 218 based on the particular direction. In this way, controller device 210 may communicate a particular direction to associate with a noise signal, an optical fiber, a particular wavelength, or the like, which permits controller device 210 to more efficiently configure optical network 204.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
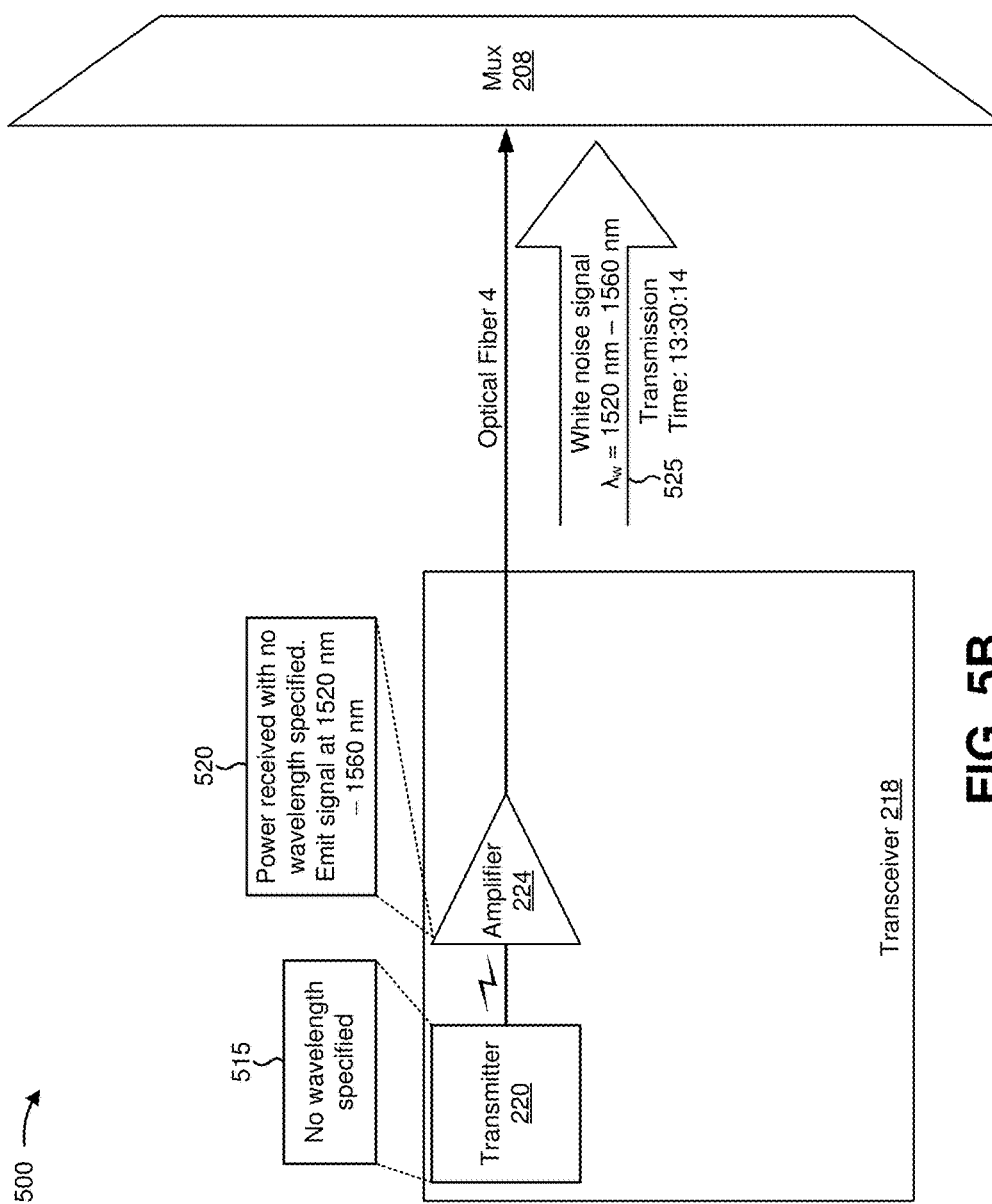
Figure 5C:
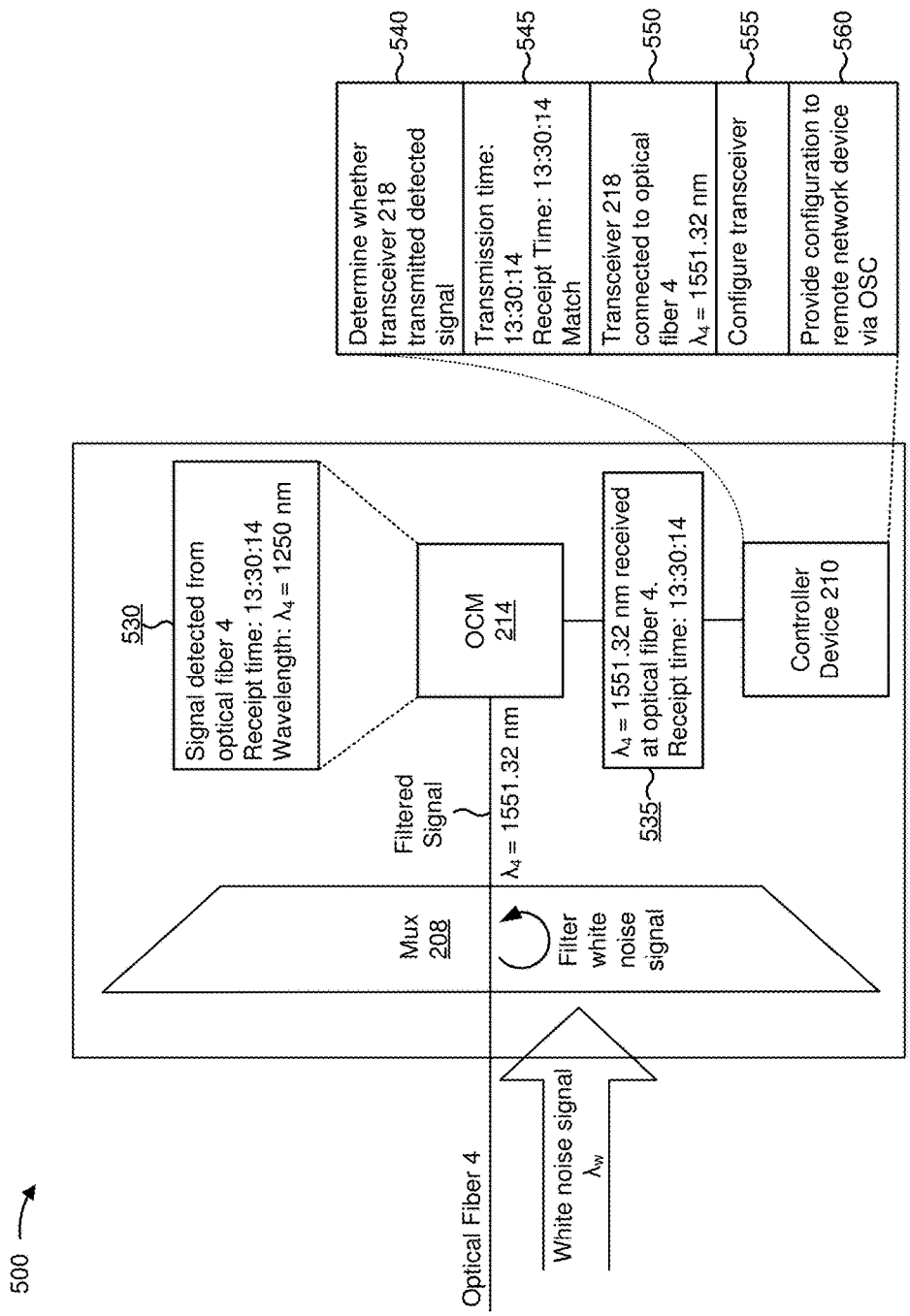

FIGS. 5A-5C are diagrams of an example implementation 500 relating to example process 400 shown in FIG. 4. FIGS. 5A-5C show an example of identifying an optical fiber connection based on a noise signal. Assume that devices shown in FIGS. 5A-5C (e.g., multiplexer 208, controller device 210, OCM 214, transceiver 218, etc.) are components of a particular network device 206, referred to as a local network device 206. Assume further that the local network device 206 is communicative, via one or more optical fibers, with a remote network device 206 that includes the components and/or devices shown in FIGS. 2B and 2C.

As shown in FIG. 5A, and by reference number 505, multiplexer 208 may be associated with a set of optical fibers (e.g., Optical Fiber 1 through Optical Fiber 8). As shown, each of Optical Fiber 1 through Optical Fiber 8 may be associated with a different wavelength of optical signal. Here, Optical Fiber 1 is associated with a wavelength of $\lambda_1=1550.12$ nm, Optical Fiber 2 is associated with a wavelength of $\lambda_2=1550.52$ nm, Optical Fiber 3 is associated with a wavelength of $\lambda_3=1550.92$ nm, Optical Fiber 4 is associated with a wavelength of $\lambda_4=1551.32$ nm, Optical Fiber 5 is associated with a wavelength of $\lambda_5=1551.72$ nm, Optical Fiber 6 is associated with a wavelength of $\lambda_6=1552.12$ nm, Optical Fiber 7 is associated with a wavelength of $\lambda_7=1552.52$ nm, and Optical Fiber 8 is associated with a wavelength of $\lambda_8=1552.92$ nm. In some implementations, multiplexer 208 may include optical fibers that are associated with additional wavelengths and/or different wavelengths.

Multiplexer 208 may filter optical signals that multiplexer 208 receives via Optical Fiber 1 through Optical Fiber 8 (e.g., based on an interaction of the optical signals with an array waveguide grating, etc.). For example, if multiplexer 208 receives an optical signal of 1550.12 nm via Optical Fiber 3, multiplexer 208 may not pass the optical signal of 1550.12 nm (e.g., based on Optical Fiber 3 being associated with a wavelength of 1550.92 nm). As shown by reference number 510, transceiver 218 may be connected to Optical Fiber 4.

As shown in FIG. 5B, and by reference number 515, transmitter 220 may not specify a particular wavelength of optical signal for amplifier 224 to amplify. As shown by reference number 520, controller device 210 may provide voltage and/or current to amplifier 224. As shown by reference number 525, amplifier 224 may emit a noise signal including wavelengths between 1520 nm and 1560 nm (e.g., $\lambda_w$=1520 nm–1560 nm). In some implementations, the noise signal may include additional and/or different wavelengths. As shown, the noise signal may travel via Optical Fiber 4 to multiplexer 208. As shown, amplifier 224 may transmit the noise signal at a transmission time of 13:30:14. Assume that controller device 210 stores information associating transceiver 218 and the transmission time of 13:30:14.

As shown in FIG. 5C, multiplexer 208 may filter the noise signal. Here, assume that array waveguide grating of multiplexer 208 passes a filtered signal of $\lambda_4$=1551.32 nm based on receiving the noise signal via Optical Fiber 4. As shown, multiplexer 208 may pass a filtered signal of $\lambda_4$=1551.32 nm to OCM 214. As shown by reference number 530, OCM 214 may detect the filtered signal in association with Optical Fiber 4, may identify the wavelength of $\lambda_4$=1551.32 nm, and may determine a receipt time of 13:30:14.

As shown by reference number 535, OCM 214 may provide information identifying Optical Fiber 4, the receipt time of 13:30:14, and the wavelength of $\lambda_4$=1551.32 nm to controller device 210. As shown by reference number 540, controller device 210 may determine whether transceiver 218, shown in FIGS. 5A and 5B, transmitted the filtered signal. As shown by reference number 545, controller device 210 may compare the transmission time and the receipt time to determine that the transmission time and the receipt time match. Assume that controller device 210 determines that the receipt time occurs less than a threshold amount of time after the transmission time (e.g., less than one second after, less than two seconds after, etc.).

As shown by reference number 550, based on the transmission time matching the receipt time, controller device 210 may determine that transceiver 218 is connected to Optical Fiber 4, associated with the wavelength of $\lambda_4$=1551.32 nm. As shown by reference number 555, controller device 210 may configure transceiver 218. Assume that controller device 210 configures transceiver 218 by causing transmitter 220 to specify the wavelength of $\lambda_4$=1551.32 nm, and by causing amplifier 224 to amplify the wavelength of $\lambda_4$=1551.32 nm. In this way, controller device 210 may determine which optical fiber, of the set of optical fibers associated with multiplexer 208, is connected to transceiver 218. By causing transceiver 218 to transmit the noise signal, controller device 210 conserves time and/or power in determining the corresponding wavelength of the optical fiber.

As shown by reference number 560, controller device 210 may provide configuration information to remote network device 206. As shown, controller device 210 may provide the configuration information via OSC 212. For example, OSC 212 may transmit the configuration information in an optical signal, via a particular wavelength, to be received by remote network device 206-2. The configuration information may include, for example, the wavelength of $\lambda_4$=1551.32 nm, a network address associated with local network device 206 and/or transceiver 218, or other information. In some implementations, local network device 206-1 and remote network device 206-2 may perform configuration operations based on the configuration information. For example, local network device 206-1 and remote network device 206-2 may determine hardware identifiers, multiplexer port identifiers, and/or network addresses, and may associate the network addresses with the hardware identifiers and/or multiplexer port identifiers, as described in more detail in FIGS. 6 and 7A-7E, below.

As indicated above, FIGS. 5A-5C are provided merely as an example. Other examples are possible and may differ from what was described with regard to FIGS. 5A-5C.

Figure 6:
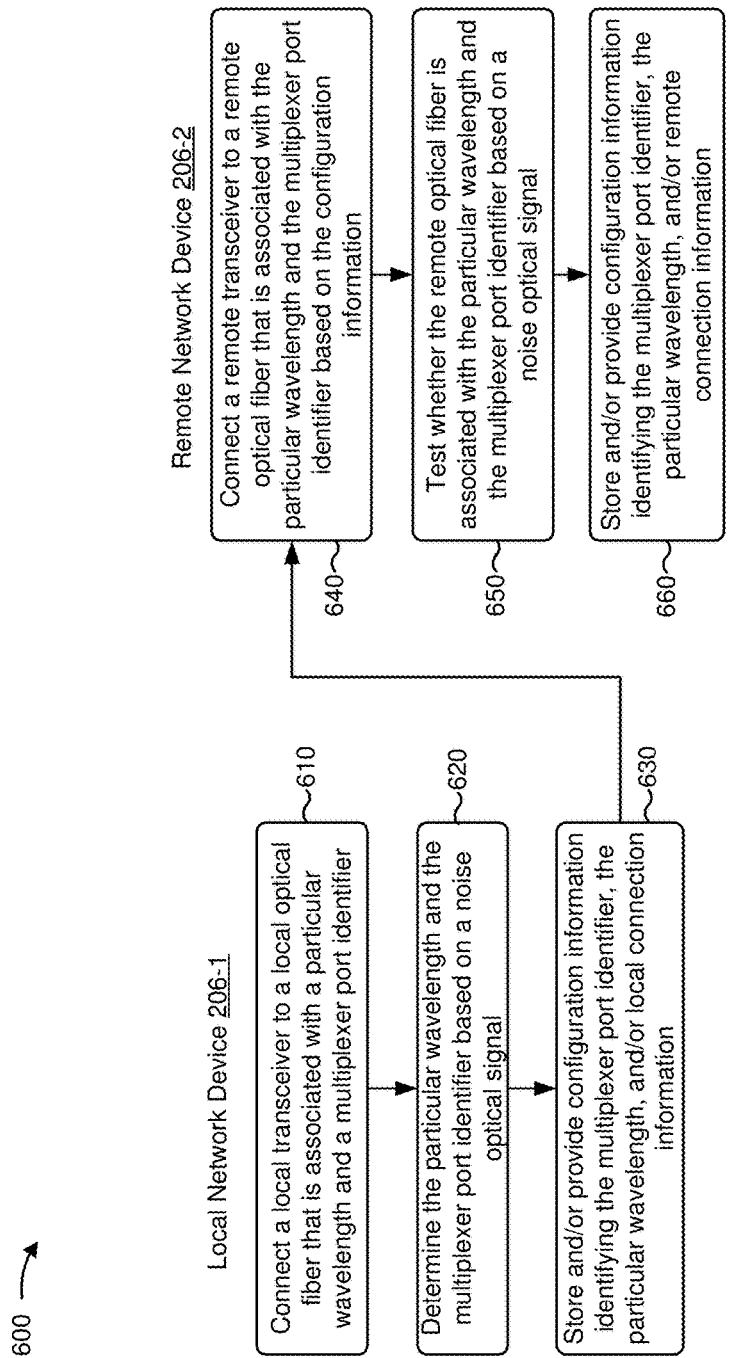
FIG. 6 is a flow chart of an example process for configuring local and remote network devices.

FIG. 6 is a flow chart of an example process 600 for configuring local and remote network devices. In some implementations, one or more process blocks of FIG. 6 may be performed by network device 206 and/or components of network device 206 (e.g., controller device 210-1 of local network device 206-1 and/or controller device 210-2 of remote network device 206-2). In some implementations, one or more process blocks of FIG. 6 may be performed by another device or a group of devices separate from or including network device 206, such as network management device 202.

As shown in FIG. 6, process 600 may include connecting a local transceiver to a local optical fiber that is associated with a particular wavelength and a multiplexer port identifier (block 610). For example, assume that local network device 206-1 and remote network device 206-2 are to be connected via optical network 204. For local network device 206-1 and remote network device 206-2 to communicate, local network device 206-1 and remote network device 206-2 may need to perform certain configuration actions. For example, local network device 206-1 and remote network device 206-2 may need to determine a wavelength at which to transmit optical signals, a multiplexer port to which to connect, a network address (e.g., an IP address) of local network device 206-1 and/or remote network device 206-2, a time slot in which to transmit optical signals of local network device 206-1 and remote network device 206-2, or the like.

Transceiver 218 of local network device 206-1 may be connected to a local optical fiber (e.g., a local optical fiber of local network device 206-1) that is associated with a particular multiplexer port. The particular multiplexer port may filter optical signals to a particular wavelength, in some implementations. Therefore, local network device 206-1 and remote network device 206-2 may need to transmit optical signals at the particular wavelength. However, it may be difficult for a technician who is installing local network device 206-1 and/or remote network device 206-2 to determine the particular wavelength.

To configure local network device 206-1 and remote network device 206-2, the technician may connect local network device 206-1 to an available local optical fiber, irrespective of the wavelength and/or multiplexer port associated with the available local optical fiber. Based on being connected to the available local optical fiber, local network device 206-1 may perform configuration operations to connect with remote network device 206-2. For example, local network device 206-1 may check whether remote network device 206-2 is associated with configuration information (e.g., a time slot, a multiplexer port, an IP address, a wavelength, etc.). If remote network device 206-2 is associated with configuration information, local network device 206-1 may be configured based on the configuration information. For example, transceiver 218 of local network device 206-1 may be connected to an identified multiplexer port, may perform Ethernet address resolution protocol with regard to a network address of remote network device 206-2, or the like.

As further shown in FIG. 6, process 600 may include determining the particular wavelength and the multiplexer port identifier based on a noise optical signal (block 620). For example, if local network device 206-1 determines that remote network device 206-2 is not associated with configuration information, local network device 206-1 may determine the particular wavelength that is associated with the optical fiber and/or a multiplexer port identifier that identifies a multiplexer port to which local network device 206-1 is connected. To determine the particular wavelength and the multiplexer port identifier, local network device 206-1 may perform the operations described in connection with FIG. 4, above.

As further shown in FIG. 6, process 600 may include storing and/or providing configuration information identifying the multiplexer port identifier, the particular wavelength, and/or local connection information (block 630). For example, based on determining the particular wavelength, local network device 206-1 may store and/or provide configuration information. The configuration information may include a network address (e.g., an IP address, etc.) of local network device 206-1, a time slot associated with local network device 206-1, the multiplexer port identifier and/or the particular wavelength associated with the local optical fiber, or the like.

In some implementations, local network device 206-1 may provide configuration information to remote network device 206-2. For example, local network device 206-1 may provide information identifying a network address (e.g., an IP address, etc.) of local network device 206-1 and/or a modem associated with local network device 206-1, a multiplexer port identifier of a multiplexer port with which transceiver 218 of local network device 206-1 is connected, a particular wavelength associated with the multiplexer port, or the like. In some implementations, local network device 206-1 may provide the information via OSC 212. Additionally, or alternatively, local network device 206-1 may provide the information to network management device 202, which may provide the information to remote network device 206-2.

By providing the configuration information to remote network device 206-2, local network device 206-1 may permit remote network device 206-2 to be configured based on the configuration information, which reduces expense and time required to plan the configuration information before connecting local network device 206-1 and remote network device 206-2.

As further shown in FIG. 6, process 600 may include connecting a remote transceiver to a remote optical fiber that is associated with the particular wavelength and the multiplexer port identifier based on the configuration information (block 640). For example, transceiver 218, of remote network device 206-2 may be connected to a remote optical fiber associated with remote network device 206-2 (e.g., by a technician, etc.). The remote optical fiber may be associated with the particular wavelength and/or multiplexer port identified by the configuration information. For example, if local network device 206-1 is connected to multiplexer port 3, the configuration information may identify multiplexer port 3, and transceiver 218 of remote network device 206-2 may be connected to an optical fiber associated with multiplexer port 3.

As further shown in FIG. 6, process 600 may include testing whether the remote optical fiber is associated with the particular wavelength and the multiplexer port identifier based on a noise optical signal (block 650). For example, remote network device 206-2 may test whether transceiver 218 of remote network device 206-2 is connected to the correct remote optical fiber and the correct multiplexer port by transmitting a noise optical signal. To test whether transceiver 218 of remote network device 206-2 is connected to the correct remote optical fiber, remote network device 206-2 may perform operations described in more detail in connection with FIG. 4, above.

As further shown in FIG. 6, process 600 may include storing and/or providing configuration information identifying the multiplexer port identifier, the particular wavelength, and/or remote connection information (block 660). For example, remote network device 206-2 may store and/or provide configuration information based on being connected to the remote optical fiber. The configuration information may identify a network address of remote network device 206-2, a multiplexer port identifier associated with the remote optical fiber, a wavelength and/or time slot for optical signals transmitted by remote network device 206-2, or the like.

In some implementations, remote network device 206-2 may provide the configuration information to local network device 206-1 (e.g., via OSC 212, via network management device 202, etc.). Network devices 206-1 and 206-2 may perform configuration operations based on configuration information associated with network devices 206-1 and 206-2. For example, network devices 206-1 and 206-2 may perform an Ethernet Address Resolution protocol to associate network addresses of network devices 206-1 and 206-2 (e.g., IP addresses, network ports, etc.) with hardware addresses of network devices 206-1 and 206-2 (e.g., multiplexer ports, network device identifiers, etc.). In this way, network devices 206-1 and 206-2 may determine configuration information without preemptively planning the configuration information using noise optical signals. This permits network devices 206-1 and 206-2 to reduce time and/or expense required to plan configuration of optical network 204.

In some implementations, controller device 210 and/or network management device 202 may determine one or more shared risk link group identifiers (SRLG identifiers) based on the configuration information. For example, controller device 210 and/or network management device 202 may aggregate configuration information determined by a set of network devices 206 of optical network 204. The aggregated configuration information may identify links between network devices 206. For example, the aggregated configuration information may identify locations of a first network device 206 and a second network device 206.

Based on the aggregated configuration information, controller device 210 and/or network management device 202 may determine SRLG identifiers. For example, controller device 210 and/or network management device 202 may assign a particular SRLG identifier, from a pool of available SRLG identifiers, to a first pair of links between local network device 206-1 and remote network device 206-2. As another example, controller device 210 and/or network management device 202 may assign different SRLG identifiers to a second pair of links between local network device 206-1 and two other network devices 206 (e.g., other than remote network device 206-2). In this way, controller device 210 and/or network management device 202 may assign SRLG identifiers to links of optical network 204 based on aggregated configuration information, which reduces a quantity of errors when assigning the SRLG identifiers and/or reduce time required to implement the SRLG identifiers.

As another example, controller device 210 may cause remote network device 206-2 to transmit an optical signal in a particular direction of a ring-based configuration. For example, if the configuration indicates that local network device 206-1 transmits an optical signal at a wavelength of 1200 nm in a clockwise direction via a particular optical fiber, remote controller device 210 may cause remote network device 206-2 to transmit an optical signal at the wavelength of 1200 nm in a counter-clockwise direction via the particular optical fiber. In this way, remote controller device 210 may configure network devices 206 of a ring-based configuration, which improves efficiency of implementing ring-based configurations in optical network 204.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of identifying an optical fiber connection based on a noise signal.

Figure 7A:
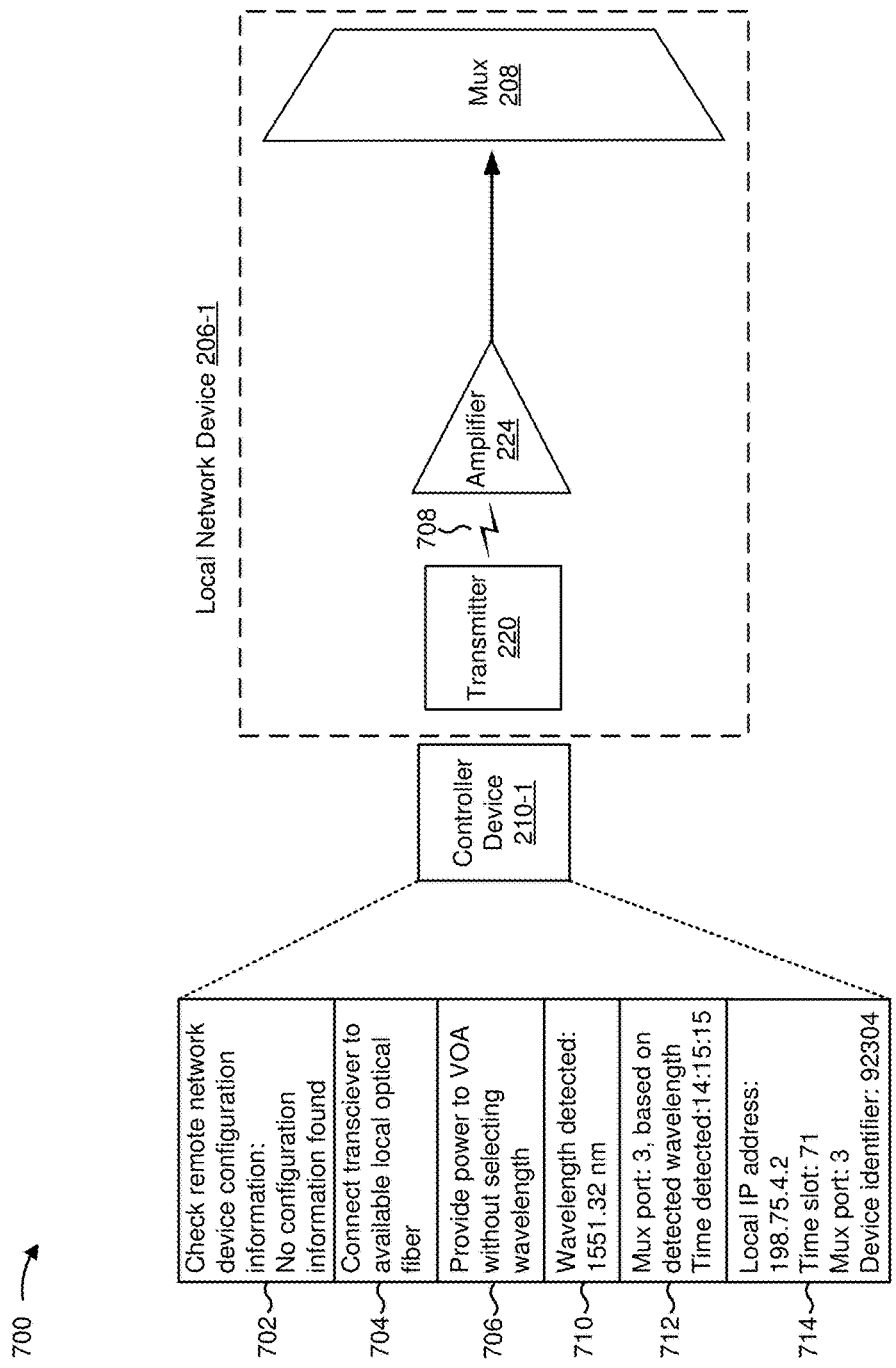
FIGS. 7A-7E are diagrams of an example implementation relating to the example process shown in FIG. 4.

As shown in FIG. 7A, and by reference number 702, controller device 210-1 may determine whether remote network device 206-2 is associated with configuration information. The configuration information may include the IP address of remote network device 206-2, information identifying the chassis, slot and port of transceiver 218 of remote network device 206-2, and information identifying the chassis, slot, and port of the WDM (e.g., multiplexer port) to which transceiver 218 is connected. Assume that controller device 210-1 requests configuration information from network management device 202, and does not receive configuration information relating to remote network device 206-2 from network management device 202.

As shown by reference number 704, a technician may connect transceiver 218 to an available local optical fiber. As shown by reference number 706, to determine a wavelength and/or multiplexer port associated with the available local optical fiber, transceiver 218 (e.g., transmitter 220 of transceiver 218) may determine to provide power to amplifier 224 without specifying a particular wavelength of optical signal to generate. As shown by reference number 708, transmitter 220 provides the power to amplifier 224. As shown by reference number 710, OCM 214 may detect a wavelength of 1551.32 nm. Assume that OCM 214 provides information identifying the wavelength of 1551.32 nm to controller device 210-1. As shown by reference number 712, controller device 210-1 may determine that transceiver 218 is connected to a local optical fiber associated with multiplexer port 3, and may determine a time at which OCM 214 detected the optical signal.

As shown by reference number 714, controller device 210-1 may determine configuration information for local network device 206-1. As shown, controller device 210-1 determines an IP address of local network device 206-1 (e.g., 198.75.4.2), a time slot for signals transmitted via multiplexer port 3 (e.g., 71), a multiplexer port identifier (e.g., 3), and a device identifier of local network device 206-1 (e.g., 92304).

Figure 7B:
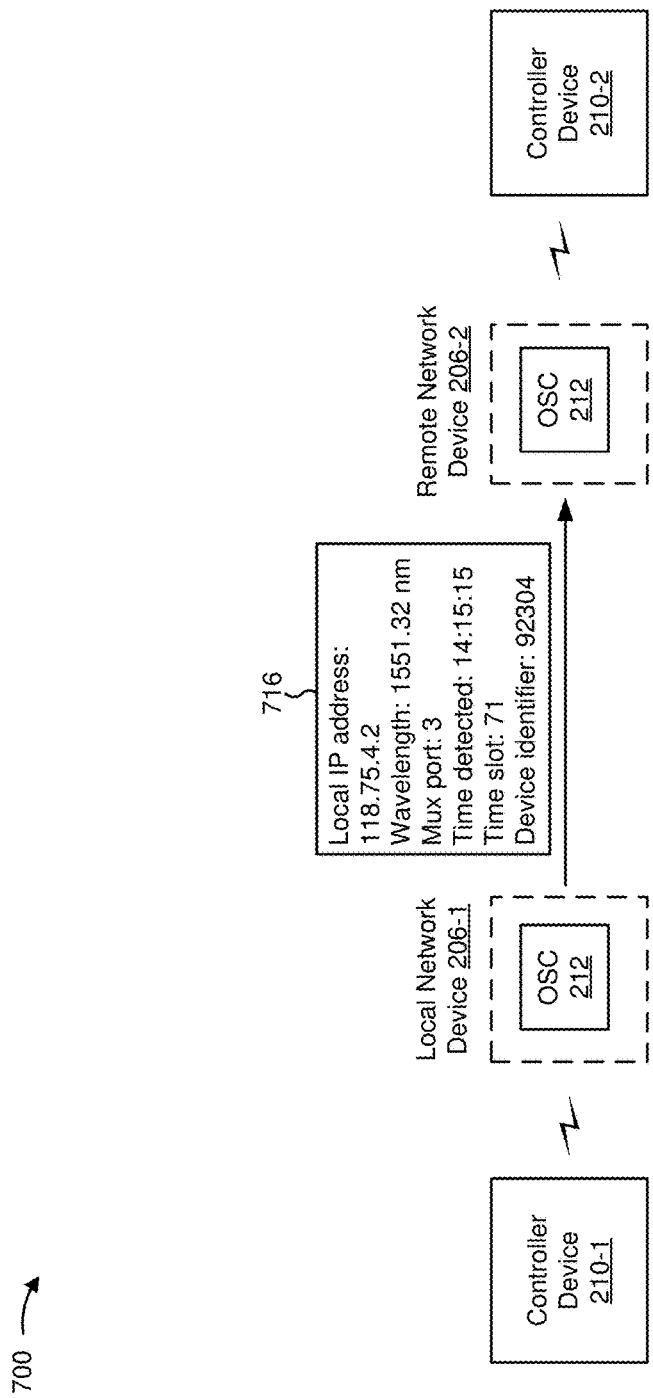

As shown in FIG. 7B, and by reference number 716, controller device 210-1 provides the configuration information to remote network device 206-2 via OSC 212. As further shown, OSC 212 of remote network device 206-2 may provide the remote configuration information to controller device 210-2.

Figure 7C:
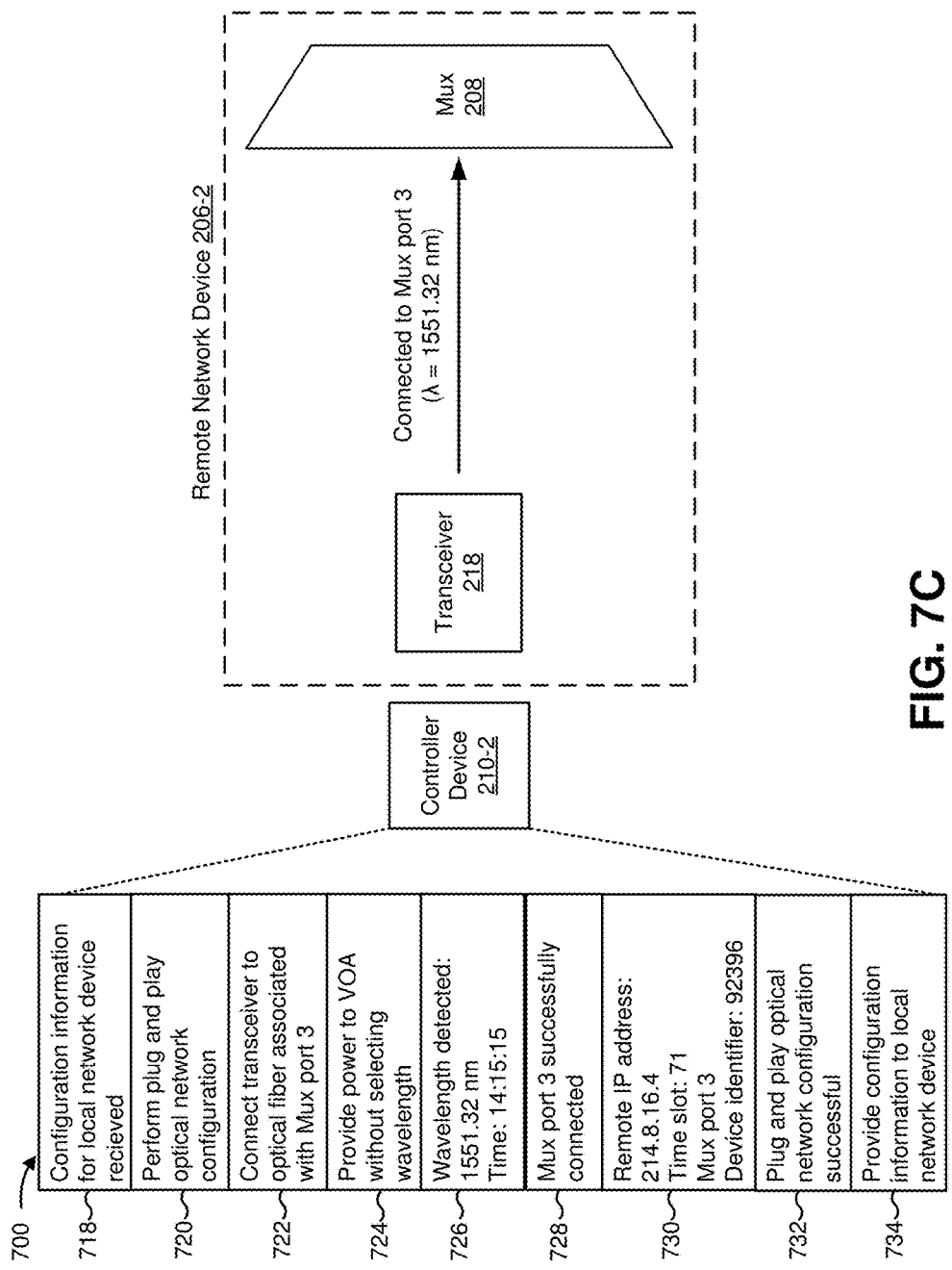

As shown in FIG. 7C, and by reference number 718, controller device 210-2 may receive the configuration information for local network device 206-1. As shown by reference number 720, controller device 210-2 may determine to perform plug and play operations to configure remote network device 206-2 to communicate with local network device 206-1, as described in more detail below.

As shown by reference number 722, based on the connection information, transceiver 218 may be connected to a remote optical fiber associated with multiplexer port 3. Assume that a technician connects transceiver 218 to the remote optical fiber. As shown by reference number 724, controller device 210-2 may test whether transceiver 218 is connected to the correct remote optical fiber by causing a noise optical signal to be transmitted to the remote optical fiber. To transmit the noise optical signal, transceiver 218 may provide power to amplifier 224 without specifying a particular wavelength.

As shown by reference number 726, amplifier 224 may receive information indicating that an optical signal with a wavelength of 1551.32 nm is detected (e.g., by OCM 214) at a time of 14:15:15. As shown by reference number 728, based on the optical signal with the wavelength of 1551.32 nm and the time of 14:15:15, controller device 210-2 may determine that transceiver 218 is connected to the correct remote optical fiber and/or multiplexer port 3. As shown by reference number 730, controller device 210-2 may determine configuration information for remote network device 206-2. Here, controller device 210-2 determines an IP address of 214.8.16.4, a time slot of "71," a multiplexer port identifier of "3," and a device identifier of remote network device 206-2 of "92396."

As shown by reference number 732, controller device 210-2 may determine that plug and play optical network configuration is successful (e.g., based on local network device 206-1 and remote network device 206-2 being associated with multiplexer port 3, the wavelength of 1551.32 nm, and the time slot of 71). As shown by reference number 734, controller device 210-2 may provide configuration information, relating to remote network device 206-2, to local network device 206-1.

Figure 7D:
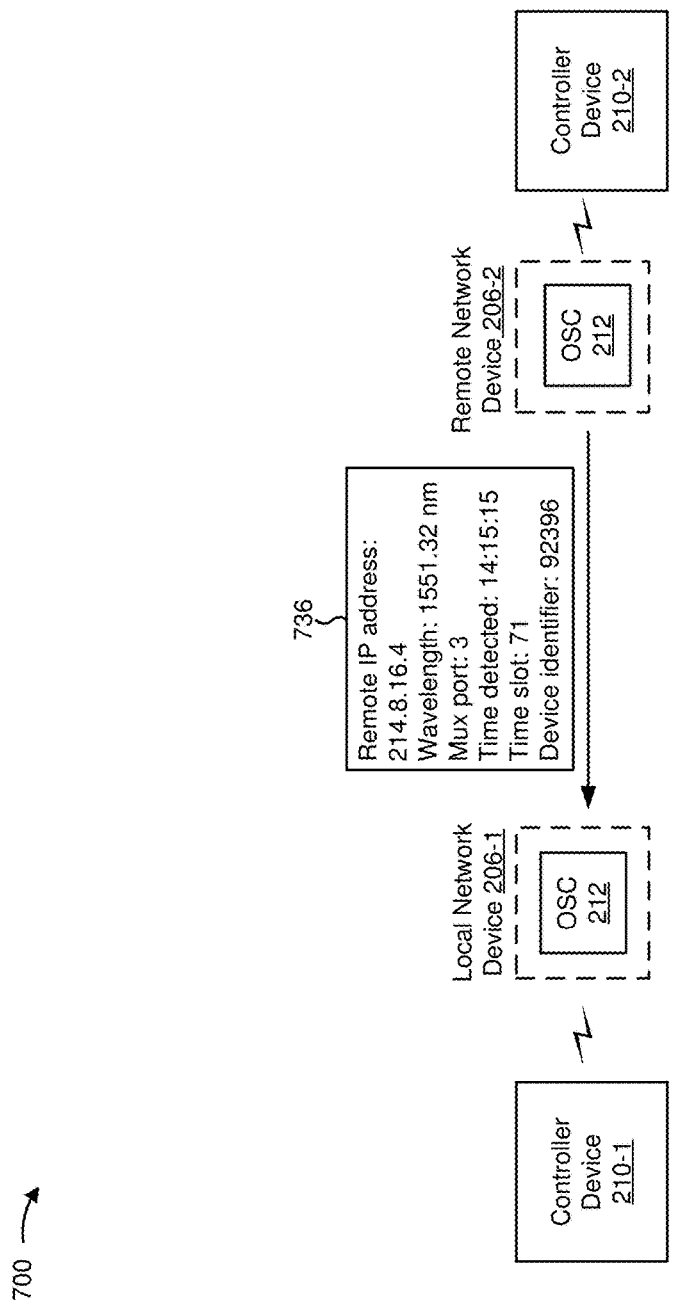

As shown in FIG. 7D, and by reference number 736, controller device 210-2 of remote network device 206-2 may provide, to local network device 206-1, configuration information via OSC 212. In some implementations, controller device 210-2 may provide the configuration information to another device (e.g., network management device 202), and the other device may provide the configuration information to local network device 206-1 and/or controller device 210-1.

Figure 7E:
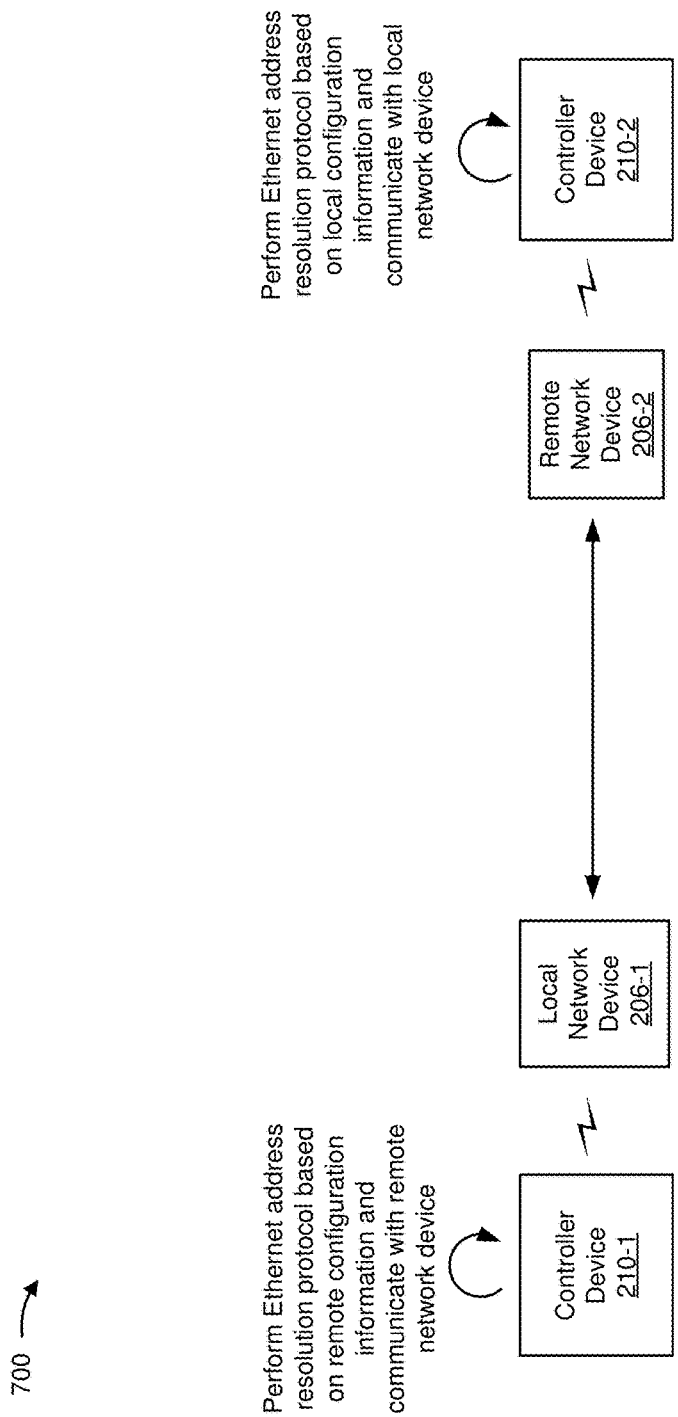

As shown in FIG. 7E, network devices 206-1 and 206-2 may perform an Ethernet address resolution protocol based on configuration information associated with network devices 206-1 and 206-2. The Ethernet address resolution protocol may associate network addresses of network devices 206-1 and 206-2 (e.g., 118.75.4.2 for local network device 206-1 and 214.8.16.4 for remote network device 206-2) with device identifiers of network devices 206-1 and 206-2 (e.g., 92304 for local network device 206-1 and 92396 for remote network device 206-2). As further shown, based on the Ethernet address resolution protocol and/or the plug and play configuration operation, network devices 206-1 and 206-2 may communicate. In this way, network devices 206-1 and 206-2 may configure optical network 204 based on plug and play configuration operations. This reduces effort required to plan optical network 204 and/or to determine causes of configuration errors in relation to network device 206.

As indicated above, FIGS. 7A-7E are provided merely as an example. Other examples are possible and may differ from what was described with regard to FIGS. 7A-7E.

Implementations described herein may enable network device 206 to determine a particular wavelength at which to transmit an optical signal via an optical fiber. By transmitting a noise signal via the optical fiber, network device 206 reduces an amount of time and/or effort required to determine the particular wavelength (e.g., based on multiplexer 208 filtering wavelengths other than the particular wavelength). Implementations described herein may provide configuration information to transceiver 218, or another device, based on determining the particular wavelength, which improves efficiency and reduces time consumption when implementing network device 206, or other network devices 206, in an optical network 204.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
 a transceiver comprising:
  a transmitter, and
  an amplifier to transmit a noise signal of a plurality of wavelengths when the transmitter does not specify a wavelength;
 an optical fiber connected with the transceiver and transporting the noise signal,
  the optical fiber being associated with a particular wavelength;
 a multiplexer to:
  receive the noise signal via the optical fiber,
   the multiplexer being connected to a plurality of optical fibers,
    the plurality of optical fibers including the optical fiber,
  filter the plurality of wavelengths based on the particular wavelength, and
  pass a filtered signal, of the particular wavelength, to an optical channel monitor;
 the optical channel monitor to:
  detect the filtered signal and determine the particular wavelength; and
 a controller device to:
  cause the amplifier to transmit the noise signal, and
  determine that the filtered signal is associated with the transceiver.

2. The system of claim 1, where the multiplexer comprises:
 an array waveguide grating to filter signals received via the plurality of optical fibers based on a plurality of respective wavelengths associated with the plurality of optical fibers.

3. The system of claim 1, further comprising:
 an optical supervisory channel device to transmit at least one of information identifying the particular wavelength, information identifying the optical fiber, or information identifying the system to another system.

4. The system of claim 1, where the controller device comprises:
 storage to store information identifying a transmission time associated with the noise signal and information identifying a receipt time associated with detecting the filtered signal; and
 a processor to determine that the filtered signal is associated with the transceiver based on comparing the transmission time and the receipt time.

5. The system of claim 1, where the amplifier includes at least one of:
 a semiconductor optical amplifier, or
 a doped fiber amplifier.

6. A device, comprising:
 one or more processors to:
  cause an amplifier to transmit a noise signal,
   the noise signal being transmitted via an optical fiber, of a plurality of optical fibers;
  detect the noise signal;
  determine that the noise signal is associated with the optical fiber and that the noise signal originates from the amplifier;
  obtain, via an optical supervisory channel, information identifying another device, a particular wavelength, and another optical fiber of a plurality of other optical fibers;
configure the amplifier to transmit a signal of the particular wavelength; and
configure the device to transmit the signal of the particular wavelength toward the other device and the other optical fiber.

7. The device of claim 6,
where the one or more processors, when obtaining the information, are to:
obtain information identifying a first direction,
the first direction being a direction in which to transmit the signal of the particular wavelength based on the device and the other device being included in a ring-based optical network; and
where the one or more processors, when configuring the device, are to:
configure the device to transmit the signal of the particular wavelength based on the first direction.

8. The device of claim 6, where the one or more processors are further to:
filter the noise signal to pass an optical signal of the particular wavelength; and
determine that the particular wavelength passed with regard to the optical signal matches the particular wavelength obtained in the information.

9. The device of claim 6, where the one or more processors are further to:
aggregate information, from a plurality of other devices, describing a plurality of other optical fibers and locations of the other devices;
determine one or more shared risk link group identifiers related to links between the device and one or more of the plurality of other devices; and
store or provide information assigning the one or more shared risk link group identifiers to the links.

10. The device of claim 9, where the one or more shared risk link group identifiers are determined based on selecting the one or more shared risk link group identifiers from a pool of available shared risk link group identifiers.

11. The device of claim 6, where the one or more processors, when causing the amplifier to transmit the noise signal, are to:
provide current to the amplifier without providing an optical signal of a particular wavelength to the amplifier.

12. The device of claim 6, where the one or more processors, when determining that the noise signal originates from the amplifier, are to:
determine that the noise signal originates from the amplifier based on a time at which the amplifier transmits the noise signal and based on a time at which the noise signal is detected.

13. A method comprising:
causing, by a device, an amplifier to transmit a noise signal by providing a current to the amplifier without providing an optical signal of a particular wavelength to the amplifier,
the noise signal being transmitted via an optical fiber, of a plurality of optical fibers;
detecting, by the device, the noise signal;
determining, by the device, that the noise signal is associated with the optical fiber and that the noise signal originates from the amplifier;
obtaining, by the device, information identifying another device, the particular wavelength, and another optical fiber of a plurality of other optical fibers;
configuring, by the device, the amplifier to transmit a signal of the particular wavelength; and
configuring, by the device, the device to transmit the signal of the particular wavelength toward the other device and the other optical fiber.

14. The method of claim 13,
where obtaining the information comprises:
obtaining information identifying a first direction,
the first direction being a direction in which to transmit the signal of the particular wavelength based on the device and the other device being included in a ring-based optical network; and
where configuring the device comprises:
configuring the device to transmit the signal of the particular wavelength based on the first direction.

15. The method of claim 13, further comprising:
filtering the noise signal to pass an optical signal of the particular wavelength; and
determining that the particular wavelength passed with regard to the optical signal matches the particular wavelength obtained in the information.

16. The method of claim 13, further comprising:
aggregating information, from a plurality of other devices, describing a plurality of other optical fibers and locations of the other devices;
determining one or more shared risk link group identifiers related to links between the device and one or more of the plurality of other devices; and
storing or provide information assigning the one or more shared risk link group identifiers to the links.

17. The method of claim 16, where the one or more shared risk link group identifiers are determined based on selecting the one or more shared risk link group identifiers from a pool of available shared risk link group identifiers.

18. The method of claim 13, where determining that the noise signal originates from the amplifier comprises:
determining that the noise signal originates from the amplifier based on a time at which the amplifier transmits the noise signal and based on a time at which the noise signal is detected.

19. The method of claim 18, further comprising:
storing information identifying the time at which the amplifier transmits the noise signal.

20. The method of claim 13, where the amplifier includes at least one of:
a semiconductor optical amplifier, or
a doped fiber amplifier.

* * * * *